United States Patent [19]

Rehm et al.

[11] 3,848,230

[45] Nov. 12, 1974

[54] INFORMATION TRANSMISSION SYSTEM

[75] Inventors: John F. Rehm, Bowie; Evan E. M. Lloyd, Columbia, both of Md.

[73] Assignee: The Singer Company, Binghamton, N.Y.

[22] Filed: June 15, 1973

[21] Appl. No.: 370,456

[52] U.S. Cl. .................................................. 340/163
[51] Int. Cl. .................................................. H04q 5/24
[58] Field of Search .................................... 340/152, 163

[56] References Cited

UNITED STATES PATENTS 3,444,520 5/1969 Messersmith ........................ 340/163

*Primary Examiner*—Ralph D. Blakeslee
*Attorney, Agent, or Firm*—William Grobman; James C. Kesterson

[57] ABSTRACT

In communication systems which involve a large amount of electronic equipment including a large number of communication channels connected among separate components, the problems of crostalk and electromagnetic interference become important. In addition, where the transmission system includes large numbers of individual channels, the cabling required to interconnect the separate components becomes very expensive and requires a high degree of skill in its assembly. The system of this invention includes a new transmission system for interconnecting several separate electronic components which utilize many separate transmission channels. The system includes a device for supplying, in digital form, the information to be transmitted or for converting that information into digital form, and multiplexing equipment for supplying with digital information a small number of separate digital transmission links for a large number of separate communications channels. The transmission of information is accomplished over the major distance which separates the electronic components in digital form. Each component comprises its own apparatus for demultiplexing the signals and for directing the information received to its own individual channel. The digital information is then converted into analog information and transmitted over individual transmission lines to the individual devices which utilize that information. This reduces the long distribution lines to a small number carrying digital information.

17 Claims, 9 Drawing Figures

DISCRETE INPUT 81

DISCRETE OUTPUT 82

ANALOG OUTPUT 83

ANALOG INPUT 84

INFORMATION TRANSMISSION SYSTEM

BACKGROUND OF THE INVENTION

1. Field of the Invention

This invention relates to electronic information transmission equipment and, more particularly, to improved equipment for reducing the high cost and the interference which were inherent in prior art communications systems.

2. Description of the Prior Art

There are many electronic communication systems such as large computer complexes, digital simulation equipment, and computer-controlled industrial processing systems where information is generated for a large number of separate load devices and is transmitted from the source of information (usually the computer) over separate channels to the individual load devices. Very often this information is transmitted over substantial distances. In a system which includes 6,000 transmission channels in both directions and where the distances separating the several major electronic components is upwards of 200 feet, many serious defects become apparent. The first and most obvious is that the large number of channels requires a lot of wiring and a lot of work—both of which are expensive. In addition, if each transmission channel is represented by its own pair of wires, there are 12,000 opportunities for outside interference to affect the information being transmitted. The transmission of analog signals through standard twisted pairs subjects the signals to outside influences due to distributed impedances, particularly where the signals change at a rapid rate. All-in-all, the transmission of analog signals over large numbers of communication links in distances of several hundred feet, has always presented problems in quality as well as in cost.

SUMMARY OF THE INVENTION

The invention comprises a method and apparatus for providing information communications links among a large number of electronic components which are widely spaced, the communications links having reduced cost and good interference protection. In the system of this invention, the information is maintained in digital form for the major transmission distances and is converted into analog form for utilization by the ultimate load devices only when adjacent the terminal utilization devices. In addition, the number of transmission lines utilized for the transmission of the digital information over the major distances is kept to as small a number as possible. The rate of information flow required for each channel is computed, and by comparing this rate with the speed of operation of the generating source, the rate at which the generated digital information can be multiplexed among a plurality of transmission lines is computed. The information is then transmitted in digital form by as few lines as possible to the individual electronic components. Apparatus within the components receives the digital information, decodes it into analog form, and transmits it to the particular device to which it is addressed.

It is an object of this invention to provide a new and improved electronic apparatus.

It is another object of this invention to provide a new and improved communications transmission system.

It is a further object of this invention to provide a new and improved system for transmitting electrical information among a plurality of electrical components.

It is still another object of this invention to provide a new and improved system for transmitting information between a central communications source and a plurality of widely spaced utilization devices to reduce the cost of the communications links and to improve the transmission characteristics of the information itself.

Other objects and advantages of this invention will become more apparent as the following description proceeds, which description should be considered together with the accompanying drawings.

DESCRIPTION OF THE PREFERRED EMBODIMENT

Figure 1:
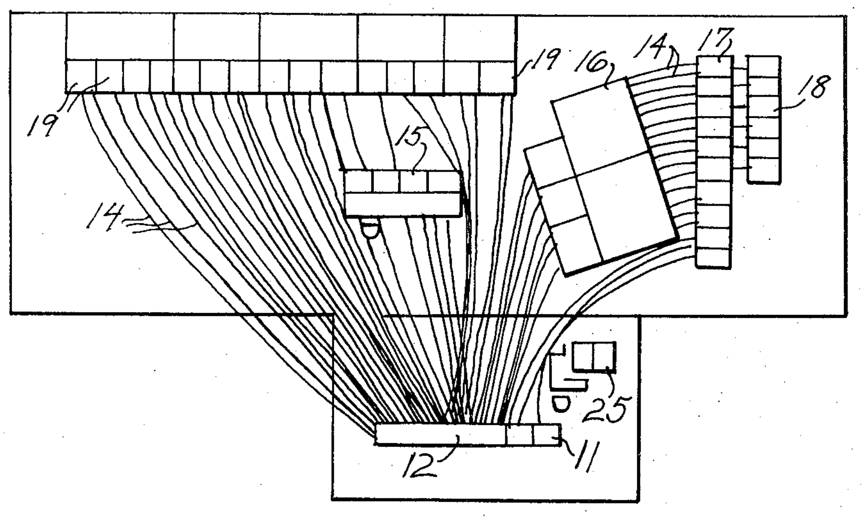
FIG. 1 is a broad overal schematic diagram of a prior art electrical communications system of the type to which this invention could apply.
Figure 2:
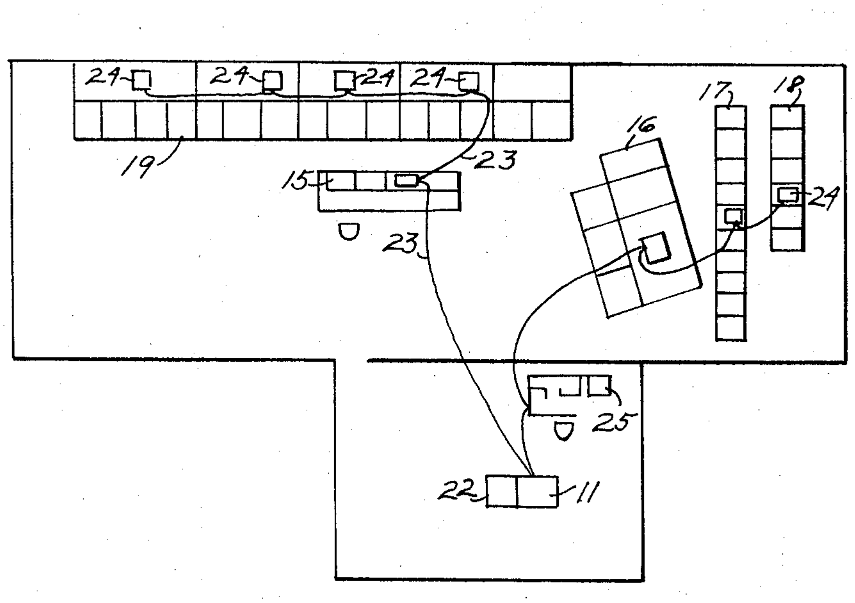
FIG. 2 is a broad overall schematic diagram of the communications system of FIG. 1 incorporating one form of this invention.

Referring to the drawings in detail, and to FIGS. 1 and 2 in particular, the reference character 11 designates a source of information to be communicated to other electronic equipment. The output from the source 11 is directly connected to the input of an interface 12 which communicates through a plurality of cables 14, each containing a number of individual wires, to the utilization equipment such as the trainee station 15, control console 16, equipment racks 17 and 18, control panels 19 and instructor station 25.

The plan views shown in FIGS. 1 and 2 are of a large simulator which is typical of the type of system in which the information transmission system of this invention would be used. In FIGS. 1 and 2, the source 11 is any type of communications source being used such as a digital computer, and the utilization equipment may be any type of information receiver which may be driven from the source 11. The system shown in FIGS. 1 and 2 is a simple view of a nuclear reactor power plant simulator in which a large control and display panel 19 contains many instruments, lights, meters and the like which are used in the actual power plant, the trainee station 15 is the plant operator's desk, the control equipment 16, 17, and 18 are components which simulate the control and the operation of the many portions of the power plant equipment, and in which the instructor station 25 is a station provided for training purposes. In such a simulator, there are thousands of different devices which are in communication with the computer 11—to receive control signals therefrom, to transmit control signals thereto, or both. For this large number of devices with which to converse, an equally large number of conversation channels must be provided. In the typical nuclear reactor power plant, there are around 6000 different conversations to be carried on. In such situations in the prior art systems, of which FIG. 1 is one, a different channel is provided to link the computer 11 with each of the individual devices of the system. This means one channel per wire, or 6,000 wires in the example set forth. The interface 12 must be the terminal for 6,000 wires, it must determine which signal is to be applied to which wire, it must determine the type of signal to be transmitted along each wire, and it must receive the signals from those wires which carry incoming signals and translate those signals into the form used by the computer. A large number of these signals may be nothing more than a single pulse which turn a lamp on or off or which operates a relay. The prior art systems are wasteful of communication channels.

The simulation system of FIG. 1 is shown in FIG. 2 with the information transmission system of this invention shown in very sketchy form. The computer 11 is directly connected to an interface 22 which is much smaller than the interface 12 of FIG. 1. The output from the interface 22 comprises two separate cables 23 (although in many cases a single cable connected to all of the components may be used) of 25 twisted pairs of wires each. All of the cables 23 are connected to all of the individual utilization devices 15–19 and 25. In each of the separete utilization devices the cable 23 is connected to a subcontroller 24.

The overall operation of the system of FIG. 2 is the same as the overall operation of the system of FIG. 1. That is, the simulator shown in both figures operates the same. However, the two figures illustrate the dramatic reduction in the amount of cabling required with the system of this invention as compared with a typical prior art system. In the system shown in FIG. 2, information is transmitted in digital form from the interface 22 to the cables 23. Each cable 23 makes a single run of several utilization devices. In each utilization device, the 25 pairs of wires are connected to the subcontroller 24 and are brought out again to continue on to the next subcontroller 24. Thus, the cable 23 carries all of the signals required to operate the entire trainer. The interface 22 contains a multiplexer which addresses the individual items of information and applies them to the individual pairs of wires in the proper sequence. All of the information carried by all of the pairs of wires is scanned at each subcontroller 24, and the subcontrollers 24 admit that information which is addressed to them. The individual subcontrollers 24 separate the individual items of information to transmit them to the individual lamps, relays or the like the pulses intended for them, and convert the digital information into analog signals for these devices which require them. This simple system is possible with a small number of wires for several reasons. Many signals in systems of this type are individual pulses which appear only at widely spaced intervals. Since a single pair of wires can carry many such pulses separated in time, there is no need to provide an individual line for each pulse as was provided in the past. In addition, the designs of the master and subcontrollers provide apparatus which enables the paralleling of a large number of channels onto a single transmission line without dissipating all of the signal energy in the high impedances of the buffers which are supposed to be open-circuited but which, in the prior art devices, were not.

Figure 3:
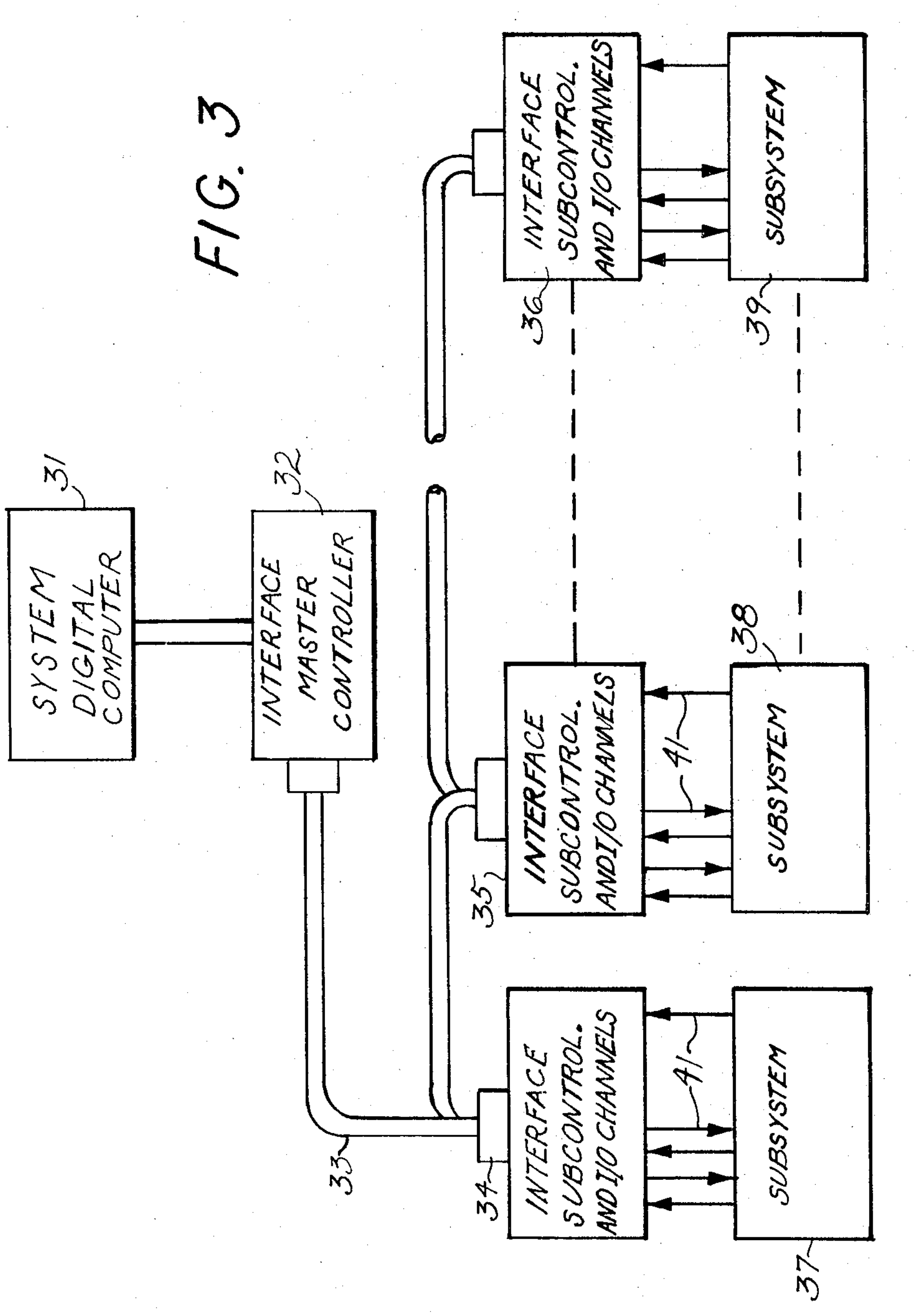
FIG. 3 is a system block diagram of a typical electronic system utilizing this invention.

FIG. 3 is a block diagram which illustrates more clearly the major components of a typical system according to this invention. A computer 31 is connected to an interface master controller 32. A single cable 33 containing, in this example, 25 twisted pairs of wires connects the master controller 32 with the remainder of the system. Since communication between any two components in this system is usually in both directions, the cable 33 cannot be considered as either an output or an input cable but as one which serves both purposes. The cable 33 is tapped at each of the subcontrollers 34, 35, 36 etc. In other words, the cable 33 is physically introduced into each of the subcontrollers 34–36, is tapped therein, and then continues to the next subcontrollers. This connects all of the subcontrollers 34–36 in parallel across the cable 33.

As information is transmitted along the cable 33 in digital form, each subcontroller 34–36 opens to extract that data which passes along the cable 33 and is intended for the particular subcontroller. The individual subcontroller transmits the data it receives to the individual utilization devices in its rack for which the data is intended. That data which is to be transmitted to the utilization devices in analog form is converted by the subcontroller from digital into analog form. This operation requires, of course, synchronization between the operations of the source of the information and the subcontrollers which receive it. Subcontroller addressing is accomplished by the use of three pairs of lines which are used exclusively for addressing purposes. This permits up to eight combinations of subcontrollers to be readily addressed. Should additional subcontrollers be required, four pairs of lines can be used for addressing purposes. The amount of information transmitted to a single address can vary from a single item of information to an entire block of information. The information transmitted with a single address can be considered a block of information of selected size. The entire information block transmitted from the source 31 to the utilization devices is updated periodically in this type of simulator as it is in most simulators. Assuming for this discussion that the information from the computer 31 is arranged in blocks of data in which each block is unique to a particular subcontroller 34, 35, 36, etc., the information in each block is arranged in a prescribed sequence and the individual subcontroller directs the information to the individual utilization devices within its particular subsystem. For example, assuming that the subsystem 37 comprises 500 instruments, relays, and lamps, the information controlling these 500 instruments, relays and lamps is arranged in a prescribed order by the digital computer 31. When the subcontroller 34 receives a block of data with its particular address, it opens to admit that block of information. The information in that block is read by the subcontroller in the order in which it is arranged. That information is then applied to the prescribed instruments, relays, and lamps in the order in which it is intended so that the proper information reaches the proper utilization devices. In order for the entire system to operate on a reasonably accurate basis, all of the information transmitted to the subsystems 37, 38, and 39 through the wires 31 from the subcontrollers 35–36 is updated after it is completely sequenced. The wires 41 connecting the individual subcontrollers 34 through 36 with individual subsystems 37 through 39 may total 6,000 in number since each instrument, relay, or lamp usually has its own line connected to it. Sequencing within the subcontrollers may be performed by any suitable mechanism. Although electro-mechanical devices such as stepping switches may be used, because of the speed of operation and the amount of data to be sequenced such devices are not considered practical. Electronic switching devices and electronic sequencing devices are generally considered more suitable for this type of operation. The type of the sequencing device to be used can take any of many forms. One such device may comprise a counter driven by a clock with the outputs from the counter driving the input to a decoding matrix. As the counter is set by the individual clock pulses, and its output lines are sequentially energized, the different energizations applied to the matrix input cause one or more output lines from the matrix to become energized in a prescribed sequence. These individual output lines can be used to control gates through which the information is applied to the individual instrument, relay or lamp. The operation of the system of this invention requires approximately the same type of programming in prescribed format that most prior art digital simulators also require.

Figure 4:
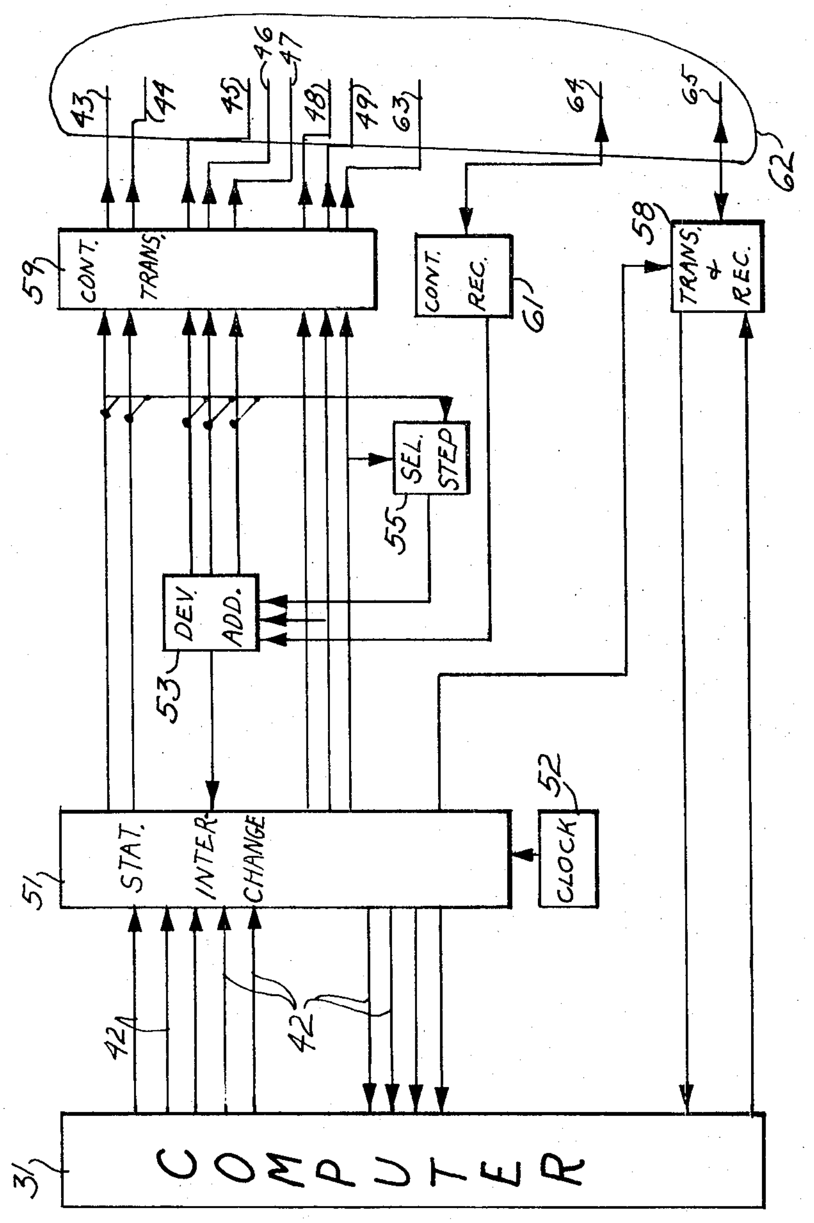
FIG. 4 is a more detailed block diagram of an overall electronic transmission system utilizing this invention.

FIG. 4 is a block diagram of the master controller in accordance with this invention. A computer 31 has connected to it a plurality of lines 42 by which it communicates in both directions with a normal computer control interchange 51. Two outputs from interchange 51, which outputs are termed mode A and mode B, are applied to the input of a block of control transmitters 59 and also to a select step circuit 55. A clear line, a strobe or timing line, and an ON line are all control lines from the interchange 51 to the control transmitters 59. The strobe line is also connected as a control input to the select step circuit 55, and the output from the step circuit 55 is a jump line which is applied to one input of a device address system 53. One output from the device address system 53 is applied to the interchange 51, and three control outputs, the three address lines, from the device address 53 are connected to the control transmitters 59. The strobe line is also connected as one input to the address device 53. There is also an enable line output from the interchange 51 which is applied to the control input of a group of data transmitters and receivers 58. The transmitters and receivers 58 comprise the information communication channels between the computer 31 and the utilization devices (not shown in this figure). There is, therefore, a data line which connects from the transmitters and receivers 59 to the computer 31 and a data line which connects from the computer 31 to the transmitters and receivers 58. In addition a control receiver 61 receives information from the subcontroller and transmits that information to the device address system 53. The outputs from the control transmitters 59 are two mode control lines 43 and 44, three address lines 45, 46, and 47, an ON line 48, a strobe line 49, and a clear line 63. The information date line is 65, and all of the control lines are bundled together to form a single cable 62.

The computer 31 is a standard, general-purpose, digital computer such as is readily available from neighborhood computer dealers. The normal computer control interchange 51 is a standard interchange sometimes called a "handshake circuit," which is required to enable the proper operation of the equipment. The master controller shown in FIG. 4 is basically the control portion of the system and the interchange 51 is that part of the control portion which talks to the computer 31 directly. Communication between the computer 31 and the interchange 51 is in both directions. For example, the computer 31 indicates over one of the lines 42 that it is ready to transmit information, and the interchange over another line 42 indicates to the computer 31 when a cycle has ended. In addition, the computer passes on to the interchange the mode of operation of the equipment, whether digital or analog data is being transmitted. This communication between the computer 31 and the interchange 51 is carried on through the lines 42. The real time clock 52 supplies pulses to synchronize the entire operation. Since the clock pulses are one form of control, the interchange 51 passes on the clock pulses through the strobe line. The control transmitters 59 is a block of line drivers which shape the digital signals, time them and ensure that they are transmitted with enough amplitude to survive the trip. A device address circuit 53 is a counter which counts the strobe pulses applied to it. The counter in the address circuit 53 generates output address signals which indicate the particular subcontroller to which the information being transmitted is directed. The select step circuit 55 generates an output signal which is called a jump signal, and it indicates when the device address circuit 53 is to skip a subcontroller address and go on to the next one. This occasionally happens when there is no data to be transmitted to one of the subcontrollers. In a similar manner, the control receiver 61 receives a signal from the subcontrollers which indicates when all of the subcontrollers have received their information. The output from the control receiver 61 is applied to the device address 53 and causes the device address 53 to start all over again from its initial datum point. The actual data which is transmitted from the computer 31 to the various utilizing devices is passed through the transmitters and receivers 58 in both directions. The transmitters and receivers 58 also comprise drivers which reform, retime, and amplify the information pulses. Each of the control transmitter 59, control receiver 61, and transmitters receivers 58 have input or output lines which form parts of the cable 62 and which are connected to devices in the subcontrollers. The output lines from the transmitters 59 are 43-49 and 63, the input line for the control receiver 61 is line 64, and the line to and from the data transmitters and receivers 58 is line 65.

Figure 5:
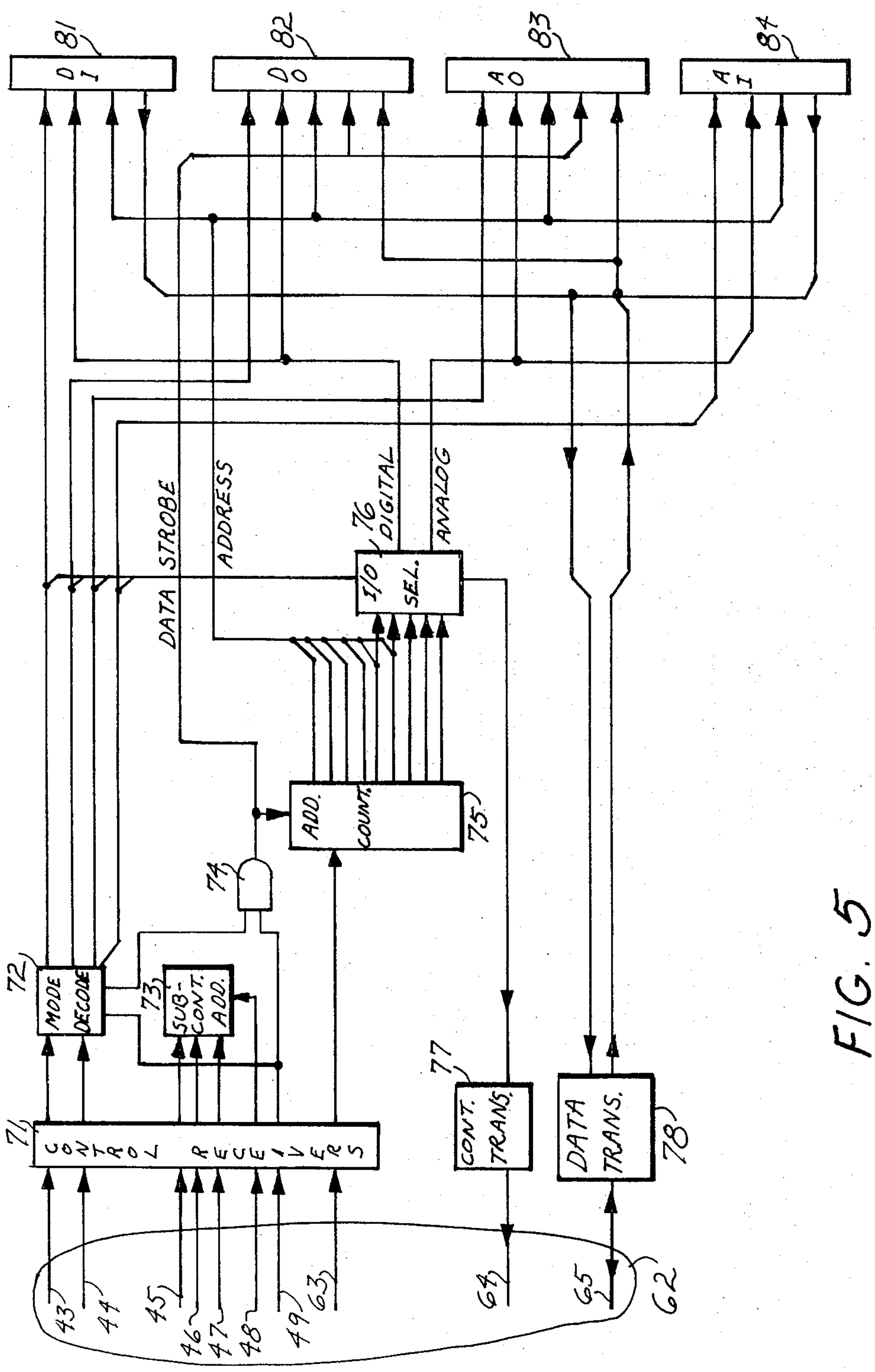
FIG. 5 is a more detailed block diagram of an overall electronic receiving system utilizing this invention.

A typical subcontroller is shown broadly in blcok form in FIG. 5. The individual twisted pairs of lines 43 through 49 and 63 through 65 of the cable 62 are connected to the individual inputs of the subcontrollers. The lines 43 through 49 and 63 are control lines and are connected to the inputs of control receivers 71. The outputs from the control receivers 71 are two lines which carry the mode signals and are applied as inputs to a mode-decode circuit 72 whose outputs are applied to four signal lines representing the digital input signals, the digital output signals, the analog output signals and, the analog input signals (DI, DO, AO, AI). Three address lines 45, 46, 47 are connected from the control receivers 71 to the subcontroller address decoder 73, and the output from the address decoder 73 is applied simultaneously to one input of the mode-decode circuit 72 and to one input of the gate 74. An ON line comes from the control receivers 71 and is applied to one input of the mode-decode circuit 72 and to the subcontroller address circuit 73. The strobe line which carries the clock pulses comes from the control receiver 71 and is applied to a second input to the gate 74. A clear line from the control receivers 71 is applied to the clear input of the address counter 75. The output from the gate 74 is applied to the count input of the address counter 75 and to the digital and analog output select devices 82 and 83. The output from the address counter 75 is applied simultaneously to the digital input select device 81, the digital output select device 82, the analog output select device 83 and the analog input select device 84. The four lines from the mode-decode circuit 72 are individually applied to the appropriate select device 81–84 and also to the input/output terminal select 76. The output from the input/output terminal select 76 is broken into two parts, one of which is a digit line which is applied to the digital input and digital output devices 81 and 82 and the other is the analog line which is applied to the analog out and the analog in select devices 83 and 84. The data output transmission line to the data transmission circuit 78 is connected from the digital input select device 81 and the analog input select device 84, and the data output line from the data transmission circuit 78 is applied to the digital output select device 82 and to the analog output select device 83.

The control receivers 71 is really nothing more than a block of transfer circuits which receive information or control signals from the individual control lines 43-49 and 63 and transmit those control signals to the appropriate devices and circuits. Thus, the lines 43 and 44, which together can generate four different combinations of signals, pass through their appropriate control receivers in the block 71 and are applied to the mode-decode circuit 72. The mode-decode circuit 72 can be a simple matrix decoder which receives the input signals from the two lines 43 and 44 and decodes them to energize a single output line which can be any of the DI, DO, AO, or AI line. Each one of these mode lines is applied to its particular selector circuit 81–84 and serves to condition the particular select circuit for the transmission of data therethrough. The selector circuits 81–84 are shown as single individual devices whereas, in reality, in a large complex machine each of the DI, DO, AO, of AI selector control circuits may comprise a large number of individual devices. Each of the selector circuit 81–84 comprises a gating switching arrangement which feeds a multitude of signal transfer lines, one line for each of the meters, relays, lamps, etc., on the control panel. In the convention used in this specification the term "input" means data being trasmitted to the computer unit, and the term "output" means the data being transferred from the computer. In this way the data input of the selector circuit 81 is connected to a large number of control devices, instruments, etc., located in its particular section of the simulator or trainer, and the data from them is transmitted through the selector panel 81 and the appropriate data transmission circuit 78 and line 65 to the receivers 58, where it is applied to the input of the computer 31. By the same token, information comes from the computer 31, through the appropriate transmitters 58 and the line 65 to the data transmission circuit 78 which then supplies the data to the digital output selector 82 or the analog output selector 83, depending upon the type of data being transmitted. The real time clock 52 supplies the control circuits 51 with clock signals transmitted over the strobe line through the appropriate transmitter 59 and the line 49. The strobe signals are nothing more than clock pulses which pass through the appropriate receiver 71 and are applied to the gate 74. When there is a valid address from the address decoder 73, the gate 74 is conditioned, and each time a clock pulse or strobe pulse is applied, the gate 74 opens to pass an output pulse. These clock pulses are counted by the address counter 75. The address counter 75 generates output signals on its several lines, and the address comprises two portions. One portion of the address is applied to the IO terminal select circuit 76 which decodes it and applies the decoded address to the selectors 81–84. That portion of the address coming from the terminal select 76 selects or addresses that portion of the particular selector circuit 81–84 which has information applied to it. The other part of the output from the address counter 75 is applied directly to the individual selectors 81–84 in parallel, and it determines which of the many meters, lamps, relays, etc. which are connected to the selected portion is operatively connected to transmit or receive information at any instant. The direct output from the counter 75 as usually taken from the least significant bits of the count value. The value represented by these bit changes most rapidly and switches which one device is connected to the selected portion of a particular output selector most rapidly. Once all of the devices have been scanned the terminal select 76 changes its output address to connect in the next portion of the particular selector being serviced. When all of the portions and all of the portions of the chosen selector have been serviced, the terminal select circuit 76 generates a separate output signal which is applied to the input of the control transmitter 77. This signal is the rollover signal and is applied through the line 64 to the control receiver 61 and to the input of the device address 53 to change the address of the subcontroller generated by the device address 53. The IO terminal select circuit 76 is constructed so that the particular time when the rollover signal is generated can be selected to accommodate the general circuitry to any specific situation where one subcontroller may have a larger number of portions then another subcontroller. The output from the subcontroller address circuit 73 is an enable signal which is applied to the mode-decode circuit 72 and to the gate 74. The three lines 45, 46, and 47 contain binary signals representative of the particular subcontroller being addressed at any time to provide eight different combinations. Therefore, the system as disclosed herein can operate with up to eight subcontrollers. If more subcontrollers are desired, four address lines will be required. The subcontroller address circuit 73 is, in reality, a comparator circuit, each subcontroller address circuit 73 having stored in it the address of the particular subcontroller which it is located. This address may be wired in, it may set in by the appropriate switches, or it may be applied in other ways. When the information coming through cable 62 is intended for a particular subcontroller, the lines 45, 46, and 47 will carry the code of that subcontroller. The code combination on the lines 45, 46, and 47 is applied to all of the subcontrollers at the same time and is decoded in the subcontroller address circuits 73 and compared with the addresses stored therein. In that subcontroller where the two addresses coincide, the address circuit 73 generates an output signal which is applied to both the gate 74 and to the mode-decode circuit 72. On the next clock pulse which comes to strobe line 49, the gate 74 opens to pass a pulse to the address counter 73 and a pulse to each of the two selector circuits 82 and 83. The pulse applied to the address counter 75 is counted to provide the first address of the utilization element. This address is applied as a conditioning signal to all of the selector circuits 81 through 84 and determines which of the many utilization devices will receive the first data coming in on the line 65. The output of the subcontroller address circuit 73 is also applied to the mode-decode circuit 72, and this signal places an output signal on that particular output line which has been selected. Assume, for this discussion that the DO line has been selected. This means that the DO selector circuit 82 now has one signal from mode-decode circuit 72, it has a signal from the address counter 75, it has one signal from the data strobe gate 74, and it will receive a signal from the IO terminal select terminal 76. The gates within the particular selector circuit 81 through 84 which has four of its control lines energized will now be conditioned to pass the data coming in on the line 65 from the data transmission circuit 78. Assume, for example, that the particular subcontroller in question feeds information to 20 digital utilization circuits. Each time a bit of information comes through the data transmission circuits 78 a clock pulse is transmitted through line 49 and an output is received from the gate 74 by the address counter 75. This changes the output address so that each of the twenty digital utilization devices receives its own bit of information. When the twentieth utilization device has received its bit of information, the address from the counter 75 goes to 21 and indicates to the terminal select 76 that it is time to switch to the next subcontroller. This automatically terminates the conditioning signal to the DO select circuit 82, and, instead, sends a signal through the line 64 to the device address to change the address to that of the next controller.

From this it can be seen that the control signals on the input lines 43 through 49 and 63 are used to control the proper distribution of the data which is transmitted along the line 65. As shown in FIGS. 4 and 5, the data is transmitted along what appears to be single pair of lines 65. As a practical matter, however, this data is transmitted over a plurality of pairs of lines which can be connected in parallel if desired. Assume for this discussion that the digital words which represent the analog amplitudes being transmitted from the computer 31 to the particular utilization devices comprises 16 digits. For the proper transmission of analog information, 16 pairs of lines 65 connected in parallel must be used. Those 16 pairs of lines together with the nine pairs of control lines 43–49 and 63, 64 equal the 25 twisted pairs mentioned above. Then, whenever a pulse is received in the address counter 75 and the output of the address counter 75 indicates the transmission of analog data to a particular analog utilization device, 16 parallel bits comprising a single digital word are transmitted to the analog-to-digital converter (not shown in these figures) to be converted into the analog signal for that particular analog device. In addition, the equipment shown in FIG. 5 could be duplicated in each subcontroller if desired so that a plurality of parallel digital signals can be received at once. In such a system the digital information would be directed to a block of digital utilization devices in a particular sequence, and, as used in this example, 16 separate input signals could be transmitted along the parallel 16 pairs of wires in line 65 to supply digital data for 16 separate utilization devices. By transmitting information in parallel along a plurality of lines, the speed of transmission of digital data is increased so that a greater volume of such data can be transmitted in any interval of time. Transmission from the particular analog or digital utilization devices to the computer 31 proceeds in a similar manner. The information comes into the digital input select circuit 81, for example, from the digital utilization devices and is transmitted along the line 65 to the data transmission circuit 78. In order for this sequence of events to take place, the DI line output from the mode-decode circuit 72 must be energized. This conditions the DI select circuit 81 to receive such information and to further transmit it. The information is transmitted along the line 65 from the subcontroller to the input of the transmitters and receivers 58 in the subcontroller. This data is then transmitted to the input of the computer 31 where it is utilized. When all of the utilization devices in the particular subcontroller receiving information have received that information, the IO terminal select circuit 76 generates an output signal called a rollover signal which is applied to the control transmitter 77 and through the line 64 to the input of the control receiver 61. The output of the control receiver 61 is applied to an input to the device address circuit 53 which then is stepped by that signal to initiate a new output address applied to the control transmitters 59. This new coded address on the lines 45, 46, and 47 then is transmitted to all of the subcontrollers, causing a new subcontroller address device 73 to operate. In this manner a new subcontroller is addressed, and the operation commences all over again.

The discrete input circuits 81, the discrete output circuits 82, the analog output circuits 83 and the analog input circuits 84 are shown in greater detail in FIGS. 6, 7, 8 and 9 respectively. Referring to the discrete input circuits 81 shown in FIG. 6, the terminal strip 91 is adapted to have connected to it individual switches, encoders, relays, and the like which provide the computer 31 with digital data. Many individual devices are connected to the terminal strip 91, and the data is supplied on individual lines 99 to the inputs of multiplexers 92, 93, 94 and 95. To simplify the construction of the system since many integrated circuits are produced with a plurality of individual electronic components, the multiplexers have been shown as each accepting four input data lines. However, the multiplexers may be shown as one large device or as individual components which accomplish the same function. To illustrate the construction of the multiplexers, the contents of multiplexer 92 is shown in detail. The lines 99 are individually applied to the inputs of one of four AND gates 101. The other input to each of the gates 101 is connected to one output line from an address counter 96. Four outputs from the address counter 96 are applied to each of the multiplexers 92–95. The outputs from the individual gates 101 are connected together to form the output of the multiplexer and these outputs are connected together and to the input of the connecting unit 98 and 97. The connecting units 97 and 98 are the units through which the cable 62 makes connection within the individual subcontrollers.

Figure 6:
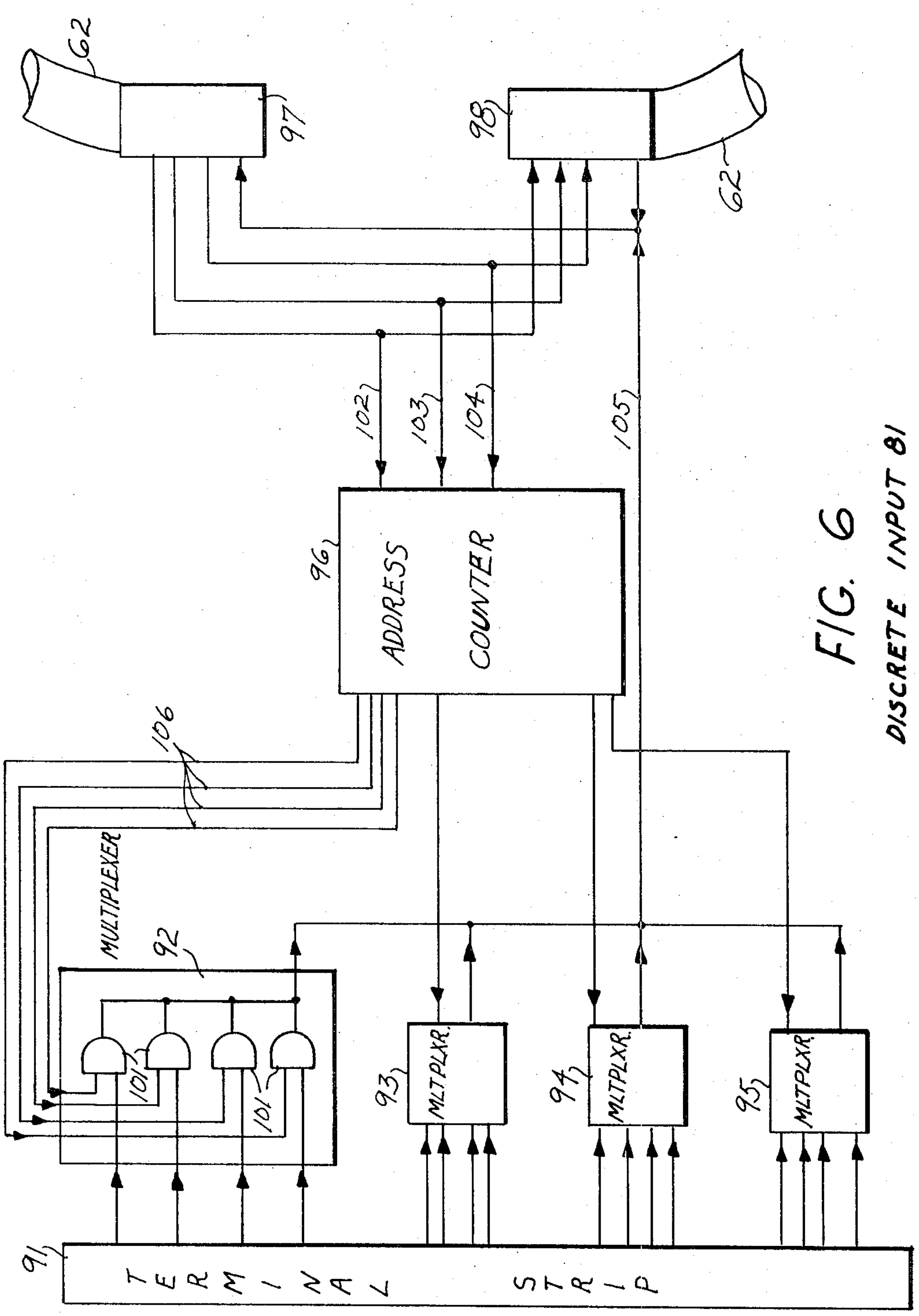
FIG. 6 is a block diagram of a typical D I circuit according to this invention.
Figure 7:
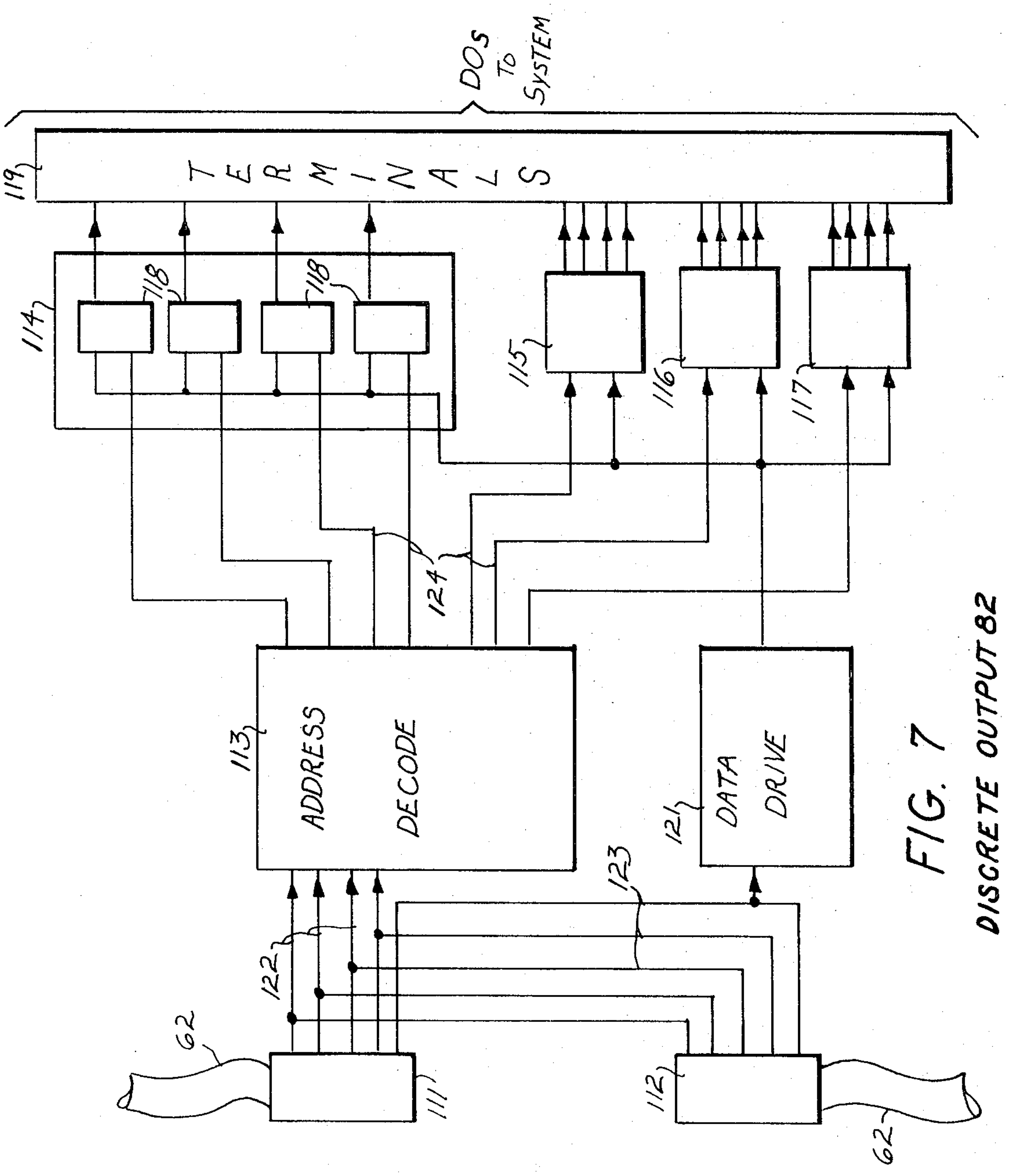
FIG. 7 is a block diagram of a typical D O circuit according to this invention.

The cable 62 enters the connector 97 from the previous subcontroller or the previous DI unit. As shown in FIG. 6, the connector 97 is electrically connected to the connector 98, and te cable 62 proceeds from the connector 98 to the next subcontroller or the next DI unit. In addition to the connectors 97 and 98 being connected together, they are also connected to the outputs of the multiplexers 92-95 by line 105 and to the inputs of the address counter 96 by three lines 102, 103 and 104. These lines are the DI mode line 102 which, when energized, enables the gates within the counter 96 to open and permit the counter to operate; the strip select line 103 which carries the address of the particular DI strip; and the address line 104 which carries the strobe or stepping pulses for the counter 96. As pulses arrive along the address line 104, the counter 96 is stepped. At each step of the counter 96, the output address of the counter changes. Thus, assuming for this discussion that on the first count of the counter 96 the top line 106 is energized, then on the next count the next lower line is energized, and so forth. On the first count, the output of the address counter 96 opens the top gate 101 to permit the data being applied to its other input to pass through and be applied to connector 98. On the next count, the next output line from the counter 96 is energized, the next gate 101 opens, and a different item of information is applied to the connector 98. Since the information on the lines 99 comes from different devices, each time the counter 96 counts, an information pulse from a different device is applied to the connector 98, and to the cable 62. In this manner, the pulsing of the counter 96 scans the information available for transmission to the computer 31 and converts it from parallel to serial form. In actuality, in one system which has been constructed, each of the lines 99 comprises 16 lines, and each of the gates 101 comprises 16 gates, and each of the output lines from the counter 96 comprises four address lines. Thus, each of the multiplexers 92–95 handles 16 devices and converts the data from the sixteen devices into serial form. In all, the unit shown in FIG. 6 handles 256 different components. And each subcontroller has up to eight such units.

It must be recalled that the information transmitted by the DI unit is in the form of a discrete pulse from each of the devices connected to it. In other words, the data is passing from the devices in the utilization portion of the system to the computer. The DO units 82 transmit the discrete information from the computer 31 to the individual devices in the utilization portion of the system. One such DO unit is shown in block form in FIG. 7. The cable 62 is connected to a connector 111 which is, in turn, electrically connected to another connector 112. The cable 62 leaves the DO unit from the connector 112. The control lines 122 are connected to the inputs of an address decode unit 113, and the data line 123 is connected to the input of a data drive unit 121, which unit is little more than an amplifier and pulse former. Output lines 124 from the address decode unit 113 are applied as inputs to all of several demultiplexers 114, 115, 116 and 117. Each of the demultiplexers 114–117 comprises a plurality of AND gates and flip-flops 118, as shown in detail in the unit 114. Four address lines from the address decoder 113 are connected individually to an input of each of the gates 118, and the data output from the driver 121 is applied to the other input of all of the gates 118. The outputs of the gates 118 are individually applied to the terminal strip 119, from which they are connected to the inputs of the individual utilization devices (not shown).

Discrete information coming from the computer is in the form of a train of serial pulses. Of this train of pulses each of the utilization devices connected to the terminal strip 119 receives only one or two. It is, therefore, necessary that the equipment separate the pulses and direct each to that particular device for which it is intended. The DO unit 82 performs this function. Information coming in along the cable 62 is applied to the address decode unit 113 and the data drive unit 121, and also to the connector 112 for application to the next DO or the next subcontroller. The address of the particular subcontroller and DO is decoded in the address decode unit 113 to admit the information intended for it only. In addition, as the address applied to the decoder 113 changes, the particular output line 124 which is energized by the decoder at any time changes.

In a system where there are eight subcontrollers each serving eight utilization devices, the first three address digits would address the subcontroller and the last three address digits would address the individual utilization devices within the subcontroller. Assuming that each line 123 carries only a single pulse train, then the output lines 124 from the decoder 113 will be energized singly. This permits one item of data to pass through a single gate 118 to a single utilization device. Assuming instead, however, that the line 123 is really four pairs of lines in parallel, then the output from the decoder 113 would appear simultaneously on four lines 124, four gates 118 would be opened to simultaneously apply the data on the four data lines 123 to four utilization devices. Of course, this can be expanded, depending upon the design of the individual system, so that the lines 123 consititue any suitable number of wires and the output from the decoder 113 is simultaneously applied to a corresponding number of gates to simultaneously energize that number of devices. It must be understood, of course, that where more data wires are used at any time, that number of wires is carried through the DO unit together. In other words, four wires would be applied to the input of the data drive unit 121; four wires would come from the output of the data drive unit 121 and be connected in parallel to each of the demultiplexers; four wires would be applied from the outputs of the demultiplexers 114–117 to the terminal strip 119. From the terminal strip 119 each wire is connected to its own utilization device.

Not all utilization devices connected in the system are digital devices which use discrete information. Some are non-digital devices which are often called analog devices. For this discussion a digital signal can be defined as a signal representative of a quantity by separate, discrete parts which can be counted. Similarly, an analog signal can be defined as one which represents a quantity by the amplitude or size of a dimension. The dimension may be a voltage, or a current flow, or the volume of a solid member, or a phase angle, or any other dimension whose size represents the quantity. Since, however, the computer 31 in the present system is digital, the information transfer between the computer and the analog devices must include converters for converting that information which is in digital form into an analog equivalent, and that information which is in analog form into a digital equivalent. The analog output units 83 and the analog input units 84 include such converters.

Figure 8:
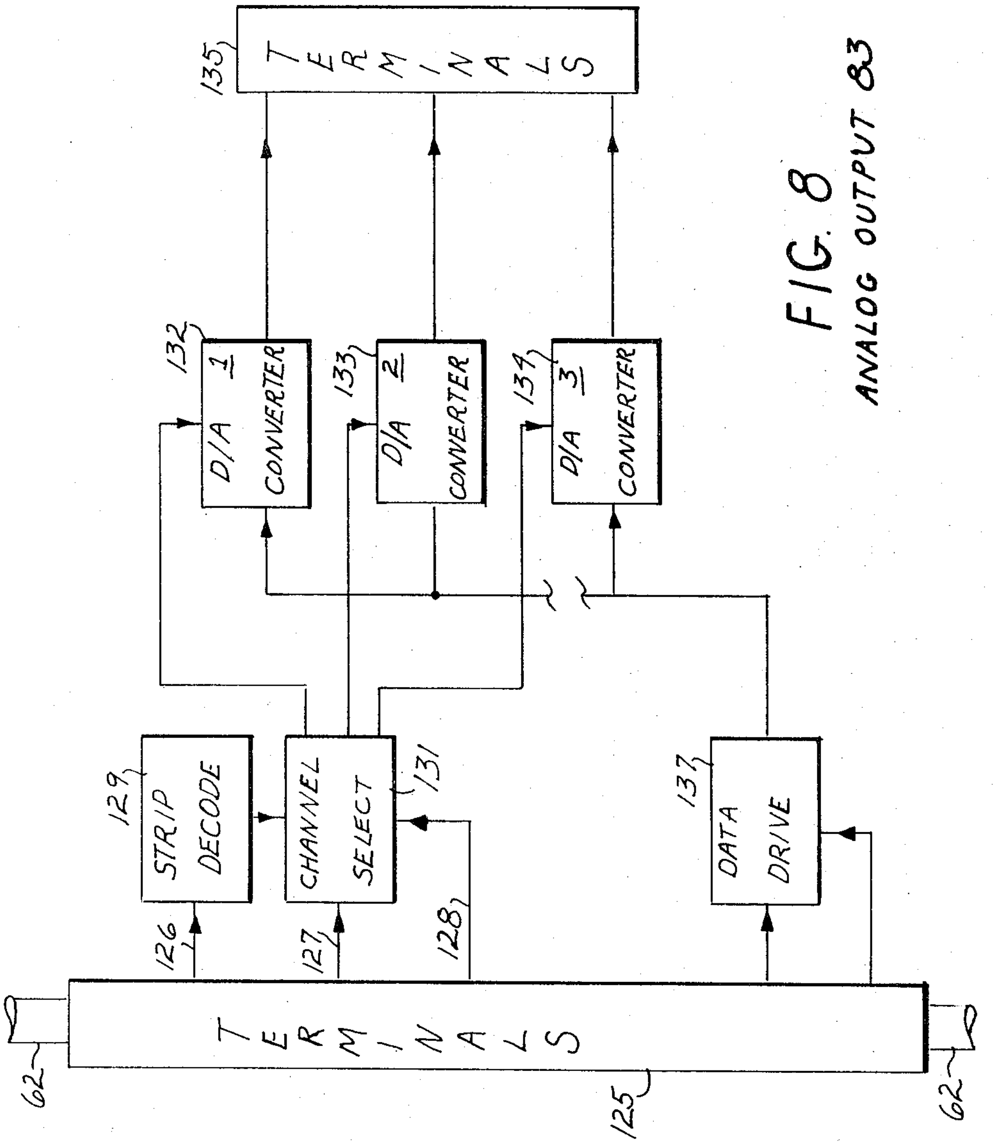
FIG. 8 is a block diagram of a typical A O circuit according to this invention.

Referring to FIG. 8, a typical AO unit 83 is shown. Cable 62 is connected to a terminal strip 125. An addressing system comprises a strip decode circuit 129 and a channel select circuit 131. The strip decode is supplied by line 126 from the terminal strip 125, and the channel select is supplied by the address line 127 and the mode line 128. The output of the strip decode 129 is applied to the channel select 131, and the output of the channel select 131 is applied to one input of each of a plurality of digital-to-analog converters 132, 133 and 134. A data line 136 connects the terminal strip 125 to the input of a data drive circuit 137 which is also fed from a strobe line 138. The output from the data drive 137 is applied to the data inputs of all of the converters 132–134. The outputs of the converters 132–134 are all connected to a terminal strip 135, and the terminal strip 135 is connected to the individual utilization devices (not shown).

The address information sent along the cable 62 includes the mode of operation (DI, DO, AO, AI), the particular strip, and the address of the information being transmitted. Most of these address components have been covered above. The strip select signal indicates the particular strip being addressed; the mode signal indicates which mode of operation (DI, DO, AO, of AI); and the address signal indicates which particular element in the strip is addressed at any time. The information being considered at this time is data to be transmitted to analog devices, and this data is represented by digital words in the computer 31. It is transmitted over cable 62 in the form of digital words, and in the subcontroller, it is converted into analog signals. Therefore, the data drive unit 137 has data presented to it on line 136 and strobed through it by a pulse on the strobe line 138. The information is in the form of a series of parallel pulses which are simultaneously applied to multidigit registers in the input end of all of the digital-to-analog converters 132–135. The outputs from the channel select unit 131 open the particular register in the converter to which the data is being applied. As shown in FIG. 8, there is an individual output from the channel select circuit 131 for each of the converters 132–135. Although only three such converters are shown, each AO can contain up to 64 such converters. The data contained, for example, in the data drive unit 137 at any time is presented to that converter which receives the addressing signal from the channel select circuit 131 at the same time. The output from the converter 132–135 which is utilized at any time is connected to the terminal strip 135, and from there it is connected to the input of the particular utilization device for which it is intended. No particular type of D/A converter is used in this invention. Any such converter which will perform the desired functions may be used, and such converters are standard, off-the-shelf components. As described herein, each such AO strip (and such a strip is what is shown in FIG. 8) may serve up to 64 separate analog devices, and a subcontroller may have up to 8 such AO strips.

Figure 9:
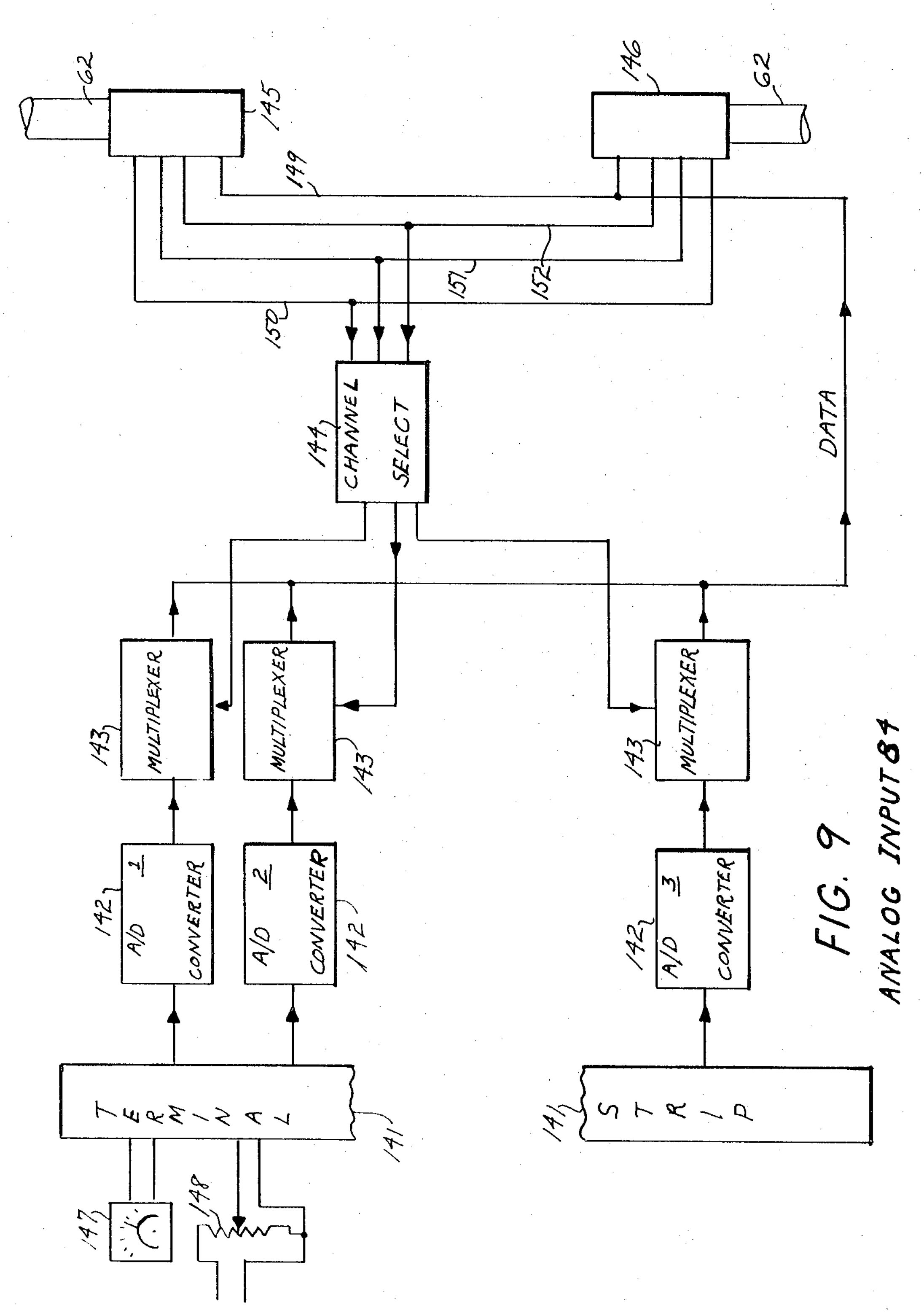
FIG. 9 is a block diagram of a typical A I circuit according to this invention.

The analog input circuits 84 are shown in block diagram form in FIG. 9. A meter 147, and a potentiometer 148 which is connected across a source of electrical energy, are both shown connected to a terminal strip 141. The terminal strip 141 is also connected to a series of analog-to-digital converters (of which only three are shown). The output of each of the A/D converters 142 is connected to the input of a multiplexer 143 (of which only three are shown). The outputs of the multiplexers 143 are connected together to a common data bus which is connected to cable terminals 145 and 146. The cable terminals 145 and 146 are connected to the cable 62 and also to three inputs of a channel select circuit 144. The output from the channel select circuit 144 is connected to an enabling input of each of the multiplexers 143. The terminals 145 and 146 are connected to the input of the channel select circuit 144 by an address line 150, a strip select line 151, and a mode select line 152. It should be noted that the analog input circuits 84 are identical to the discrete input circuits 81 from the output of the analog-to-digital converters 142 to the terminals 145 and 146.

As with each of the discrete input circuits, discrete output circuits, and analog output circuits described above, the cable 62 coming from a previous analog input circuit or subcontroller is terminated in the terminal 145 of the analog input circuits 84. The terminal 145 is connected to the terminal 146 by the three addressing lines 150, 151, and 152 and also by the data bus 149. The cable 62 continues from the terminal 146 to the next analog input circuit 84 or to the next subcontroller. In the manner described above the sequential operation of the system, in connection with the other circuits 81, 82 and 83, determines when the mode line 152 will be energized by the appropriate signals to select the analog input circuits 84, and when the line 151 will be energized by the appropriate signals for selecting the particular analog input circuit shown in FIG. 9, and also what the individual addressing signals on the address line 150 will be. The digital addressing signals contained on these three lines are decoded by the channel select circuit 144 to apply the appropriate output enabling signals to the proper multiplexers 143.

In the descriptions of the prior circuitry it was assumed that the connecting of the individual utilization devices to the appropriate terminal strips was old. However, by way of example in FIG. 9, a signalling meter 147 and a potentiometer 148 are shown connected to the terminal strip 141. These are shown for illustrative purposes only and are not intended to be limiting in any manner. The meter 147 may be of the type which generates an output signal whose amplitude is indicative of the pointer position, or the meter reading. That signal is transmitted through the terminal strip 141 and is the information which is to be transmitted eventually to the computer 31. By the same token the potentiometer 148 is shown connected across a source of DC potential. Although not shown in FIG. 9, the slide contact of the potentiometer 148 may be mechanically connected to a moving portion of the system and may be moved thereby. The moving portion of the system may be a lever operated by a trainee, it may be connected to a motion system if the overall system has one, or to any other movable device whose position is important to the operation of the system. The position of the slide contact of the potentiometer 148 determines the amplitude of the voltage which is applied to the terminal strip 141. In addition to the two examples shown in FIG. 9 other transducers may be connected to the terminal strip 141. These may be, by way of example, synchros, temperature sensitive resistors, pressure sensitive devices, etc. Also, as indicated in the previous descriptions, each terminal strip 141 may have a very large number of such devices connected to it. The two shown in FIG. 9 are only examples.

The outputs of the devices connected to the terminal strip 141 are voltages whose amplitudes provide the desired information for the computer 31. Each of these devices is connected through the terminal strip 141 to an analog-to-digital converter 142. There is nothing special about the analog-to-digital converters which are used in this system. They may be any suitable A/D converters found in the art. Each of the converters 142 transforms the analog signal input applied to it into a digital number whose value, size, quantity, etc., is indicative of the amplitude applied to its input. The digital output from each of the converters 142 is applied to the input of a multiplexer 143. Thus, when the output from the channel select circuit 144 energizes the particular line which enables the multiplixer 1, that multiplexer opens and submits its digital data to the data bus 149. Once the data has been transmitted to the cable 62, the channel select 144 is clocked, and its output changes to remove the enabling signal from the multiplexer 1 and to apply an enabling signal to multiplexer 2. The information in multiplexer 2 is transmitted to the data bus 149 and the cable 62. This operation continues until the information from all of the utilizing devices such as 147 and 148 has been converted into digital form and has been transmitted through the cable 62 to the computer 31.

SUMMARY

In review, reference is again made to FIG. 3. The system shown in this figure comprises a digital computer 31 which transmits information to and receives information from a plurality of subsystems 37, 38 and 39. Each of the subsystems 37–39 contains a multitude of individual devices which operate in response to information received from the digital computer 31 and which transmit information to the computer 31 to modify the overall operation of the system. The problem is to transmit all of these individual items of data between the subsystems and the computer 31 efficiently and with virtually no interference. In the system of this invention all information transmitted to and from the computer 31 is retained in digital form through the subcontrollers 34, 35 and 36. The only time analog data is transmitted is between an individual subcontroller and its particular subsystem. In addition to the above, digital data is multiplexed to transmit a large amount of information over a very small number of lines. The smaller the number of lines, the lower the chances of interference. The operation of this system requires synchronization between the master controller 32 and each of the individual subcontrollers 34–36. Since the data is in digital form, the individual subcontrollers are addressed by digital information contained on three address lines. In addition, within each subcontroller is at least one address counter. Clock pulses are transmitted from the master controller through a special strobe line for driving the address counters. Thus, the digital information on the address lines selects which subcontroller receives the upcoming information. The address counter in that subcontroller begins receiving the clock pulses from the master controller. As the address counter steps, the individual terminal strips in that subcontroller are sequentially addressed, and the individual subsystems connected to each addressed terminal are sequentially addressed. The address counter 75 within any subsystem together with the mode decode information selects when the DI terminal strip 81, or the DO terminal strip 82, or the AO terminal strip 83 or the AI terminal strip 84 is selected for connection to the cable 62. Once the particular terminal strip has been selected, the output of the address counter determines which of the particular devices connected to the selected terminal strip 81–84 will be connected at any instant to the cable 62. The address output from the counter 75 is stepped, and each of the devices connected to any particular terminal strip is connected to the cable 62 in sequence. When all of the devices of one terminal strip 81–84 have been connected to the cable 62, the addressing changes, and the next terminal strip is selected. The system then repeats itself.

The above specification has disclosed a new and improved data transmission system for interconnecting a plurality of individual devices with one or more central control and storage units. The particular system described provides more efficient use of time and materials by providing for sequential transmission of a large number of individual items of information over a very small number of transmission lines. By utilizing digital data transmission over those lines having the greatest length, the signal-to-noise ratio is kept very high, reducing the effects of external interference. It is realized that the above description may indicate to those skilled in the art additional ways in which the principles of this invention may be used without departing from its spirit. It is, therefore, intended that the scope of this invention will be determined solely by the scope of the appended claims.

What is claimed is:

1. A system for transmitting information which is originally in both digital form and analog form between a central unit and several widely spaced peripheral units, said system comprising a primary communication path connecting said central unit to all of said peripheral units in parallel, means at said central unit and at each of said peripheral units for converting information to be transmitted over said primary communication path into digital form so that digital information only is carried by said primary communication path, means located at least at each of said peripheral units for converting that information which is transmitted over said primary path and which is intended for analog devices from digital form into the appropriate analog form for said devices, and means for directing information intended for a particular unit to that unit alone.

2. The system defined in claim 1 wherein said central unit comprises a device which utilizes information in digital form.

3. The system defined in claim 2 wherein each of said peripheral units comprises a plurality of separate devices, which plurality comprises devices which use information in digital form and devices which use information in analog form.

4. The system defined in claim 1 wherein each of said peripheral units comprises a plurality of separate discrete devices which use information in digital form and devices which use information in analog form.

5. The system defined in claim 4 wherein said central unit includes means for arranging information to be transmitted over said primary communication path in a prescribed sequence, and means for applying addresses to said information in said sequence so that information intended for a particular peripheral unit is addressed to that unit.

6. The system defined in claim 5 wherein said central unit further includes a clock which generates periodic clock pulses, and means in said primary communication path for transmitting said addresses and said clock pulses to said peripheral units.

7. The system defined in claim 6 wherein each of said peripheral units includes an address decoder for decoding the unit addresses transmitted over the primary communication path, and means in each peripheral unit responsive to the decoding of the address for that unit for conditioning that unit to accept information from said communication path.

8. The system defined in claim 7 wherein each of said peripheral units further includes means for connecting a plurality of individual information utilization devices to said unit, an address counter, means for applying received clock pulses to the input of said address counter and means connected to the output of said address counter for connecting each of said devices to said primary communication path in sequence.

9. The system defined in claim 8 wherein said means for connecting a plurality of devices includes at least a first terminal to which are connected those devices which receive digital information from said communication path, and a second terminal to which are connected those devices which receive analog information from said communication path, said second terminal including said means for converting digital information into analog information.

10. The system defined in claim 9 wherein all of said peripheral units are connected in parallel to said primary communication path.

11. An information transmission system for transmitting digital and analog information among a plurality of widely spaced information units; said system comprising:

a. a main information transmission path and means for connecting all of said units to said path in parallel;

b. each of said units including an address responsive means for responding to a unique address transmitted along said information transmission path for conditioning the responding unit to receive information from said path;

c. means within each of said units for connecting each of said units to a plurality of separate information utilization devices; and d. means in each of said unils for applying to each of the information utilization devices that information from the transmission path which is intended for it.

12. The system defined in claim 11 wherein some of said devices utilize information in digital form and some of said devices utilize information in analog form.

13. The system defined in claim 12 wherein said main path transmits information in digital form only.

14. The system defined in claim 13 wherein said means for receiving and testing addresses generates an output signal when the address of the unit of which it is a part is received, and means in said unit and responsive to said output signal for conditioning that unit to receive the information accompanying said address.

15. The system defined in claim 14 further including a master clock which generates periodic clock pulses, and means in said main path for transmitting said unit addresses and said clock pulses.

16. The system defined in claim 15 wherein each of said units comprises an address counter having its input connected to said means for transmitting clock pulses, and means connected to the output of said address counter for switching said main transmission path from one of the devices in said unit to another of said devices in sequence.

17. The system defined in claim 16 wherein each unit includes means for converting digital information received over said main path from digital form to analog form for those devices which utilize information in analog form.

* * * * *